(12) United States Patent
LaBrecque et al.

(10) Patent No.: US 11,821,535 B2
(45) Date of Patent: Nov. 21, 2023

(54) SHAPE MEMORY ALLOY CONTROL ELEMENTS FOR HYDRAULIC VALVES

(71) Applicant: The Boeing Company, Chicago, IL (US)

(72) Inventors: Thomas LaBrecque, Edmonds, WA (US); Frederick T. Calkins, Renton, WA (US)

(73) Assignee: The Boeing Company, Chicago, IL (US)

( * ) Notice: Subject to any disclaimer, the term of this patent is extended or adjusted under 35 U.S.C. 154(b) by 67 days.

(21) Appl. No.: 17/485,690

(22) Filed: Sep. 27, 2021

(65) Prior Publication Data

US 2022/0196175 A1   Jun. 23, 2022

Related U.S. Application Data

(60) Provisional application No. 63/127,679, filed on Dec. 18, 2020.

(51) Int. Cl.
  *F16K 31/02*  (2006.01)
  *F16K 31/00*  (2006.01)

(52) U.S. Cl.
  CPC .......... *F16K 31/025* (2013.01); *F16K 31/002* (2013.01)

(58) Field of Classification Search
  CPC ...... F16K 31/025; F16K 31/406; F16K 11/07; F16K 31/002; F15B 13/0438; F15B 2211/615
  See application file for complete search history.

(56) References Cited

U.S. PATENT DOCUMENTS

| | | | | | |
|---|---|---|---|---|---|
| 2,625,136 | A | * | 1/1953 | Moog, Jr. | F15B 9/17 91/417 R |
| 2,790,427 | A | * | 4/1957 | Carson | F15B 13/0438 91/47 |
| 2,832,365 | A | * | 4/1958 | Smith | F15B 9/17 91/51 |
| 2,836,154 | A | * | 5/1958 | Lantz | F15B 13/0438 137/625.25 |
| 2,954,794 | A | * | 10/1960 | Paine | F15B 13/0438 91/47 |
| 2,962,002 | A | * | 11/1960 | Hayner | F15B 13/0438 91/417 R |
| 3,211,063 | A | * | 10/1965 | Woodrow | F15B 13/0438 137/625.62 |
| 3,302,147 | A | * | 1/1967 | Olsen | H01F 7/1646 335/230 |
| 3,346,231 | A | * | 10/1967 | Wall | F16K 31/025 236/93 R |

(Continued)

OTHER PUBLICATIONS https://depts.washington.edu/matseed/mse_resources/Webpage/Memory%20metals/how_shape_memory_alloys_work.htm (Year: 2018).*

(Continued)

*Primary Examiner* — Umashankar Venkatesan
(74) *Attorney, Agent, or Firm* — Duft & Bornsen, PC

(57) ABSTRACT

Systems and methods are provided for controlling hydraulic valves. One embodiment is a method that includes blocking an orifice for a return line of a hydraulic valve via a flapper assembly, initiating a phase change in a Shape Memory Alloy (SMA) at the flapper assembly, and opening the orifice for the return line via the flapper assembly in response to the phase change.

20 Claims, 10 Drawing Sheets

(56) References Cited

U.S. PATENT DOCUMENTS

| | | | | |
|---|---|---|---|---|
| 4,067,539 A * | 1/1978 | Perl | ................ | F23N 5/045 |
| | | | | 236/101 E |
| 6,151,897 A * | 11/2000 | Baumbick | ............... | F03G 7/065 |
| | | | | 60/527 |
| 6,367,250 B1 * | 4/2002 | Baumbick | ........... | F15B 13/0438 |
| | | | | 60/527 |
| 7,157,691 B2 * | 1/2007 | Lim | ................ | F15B 13/0438 |
| | | | | 356/73.1 |
| 10,344,780 B2 * | 7/2019 | Briancon Marjollet | ..................... | |
| | | | | F15B 13/021 |
| 10,474,169 B2 * | 11/2019 | Grödl | ................... | G05D 16/101 |
| 10,634,257 B2 * | 4/2020 | Grödl | ................... | F16K 31/128 |
| 10,883,521 B2 * | 1/2021 | Jaśkiewicz | ............. | F16F 9/464 |
| 10,954,971 B2 * | 3/2021 | Jaskiewicz | .......... | F15B 13/0438 |
| 2006/0021663 A1 * | 2/2006 | Grancher | ........... | G05D 16/2097 |
| | | | | 137/625.61 |
| 2020/0063883 A1 * | 2/2020 | Yuan | ................. | F15B 13/0438 |
| 2021/0018109 A1 * | 1/2021 | Beuschel | ............. | F16K 31/002 |

OTHER PUBLICATIONS

3-Way Directional Valve; https://www.mathworks.com/help/physmod; Jun. 17, 2020.

Herbert E. Merritt; Hydraulic control Systems; John Wiley & Sons, Inc. 1967.

\* cited by examiner

FIG. 3 OPERATING POSITION

SHAPE MEMORY ALLOY CONTROL ELEMENTS FOR HYDRAULIC VALVES

RELATED APPLICATIONS

This non-provisional patent application claims priority to U.S. Provisional Patent Application No. 63/127,679, filed on Dec. 18, 2020.

FIELD

The disclosure relates to the field of hydraulic control devices, and in particular, to hydraulic valves.

BACKGROUND

Hydraulic valves are utilized to control the flow of fluid within a hydraulic system. For example, a hydraulic valve may be operated to control whether or not an actuator within a hydraulic system is operated. Hydraulic valves are found in a variety of environments, including, for example, within vehicles such as aircraft.

As hydraulic valves within vehicles provide useful functions for controlling a variety of components within a hydraulic system, it remains important to ensure that the valves operate reliably and quickly, while remaining light enough to provide fuel efficiency benefits.

Therefore, it would be desirable to have a method and apparatus that take into account at least some of the issues discussed above, as well as other possible issues.

SUMMARY

Embodiments described herein provide flapper assemblies for hydraulic valves that have been enhanced to utilize Shape Memory Alloy (SMA) technology. By adjusting a temperature of the flapper assembly, the flapper assembly is controllably transitioned between austenitic and martensitic phases. In each phase, the flapper assembly exhibits a different shape. The change in shape between phases drives an arm of the flapper assembly into contact, and out of contact, with a return orifice of the hydraulic valve. Controllably blocking the return orifice results in control of the hydraulic valve.

One embodiment is a method for controlling a hydraulic valve. The method includes blocking an orifice for a return line of a hydraulic valve via a flapper assembly, initiating a phase change in a Shape Memory Alloy (SMA) at the flapper assembly, and opening the orifice for the return line via the flapper assembly in response to the phase change.

Another embodiment is a non-transitory computer readable medium embodying programmed instructions. When executed by a processor, the instructions are operable for performing a method for controlling a hydraulic valve. The method includes blocking an orifice for a return line of a hydraulic valve via a flapper assembly, initiating a phase change in a Shape Memory Alloy (SMA) at the flapper assembly, and opening the orifice for the return line via the flapper assembly in response to the phase change.

Another embodiment is a hydraulic valve that includes a flapper assembly disposed within a return chamber of the hydraulic valve. The flapper assembly includes a body comprising a Shape Memory Alloy (SMA), and an arm coupled with the body, that changes position in response to the SMA undergoing a phase change, wherein the arm controllably blocks an orifice for a return line in response to changes in phase of the SMA.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
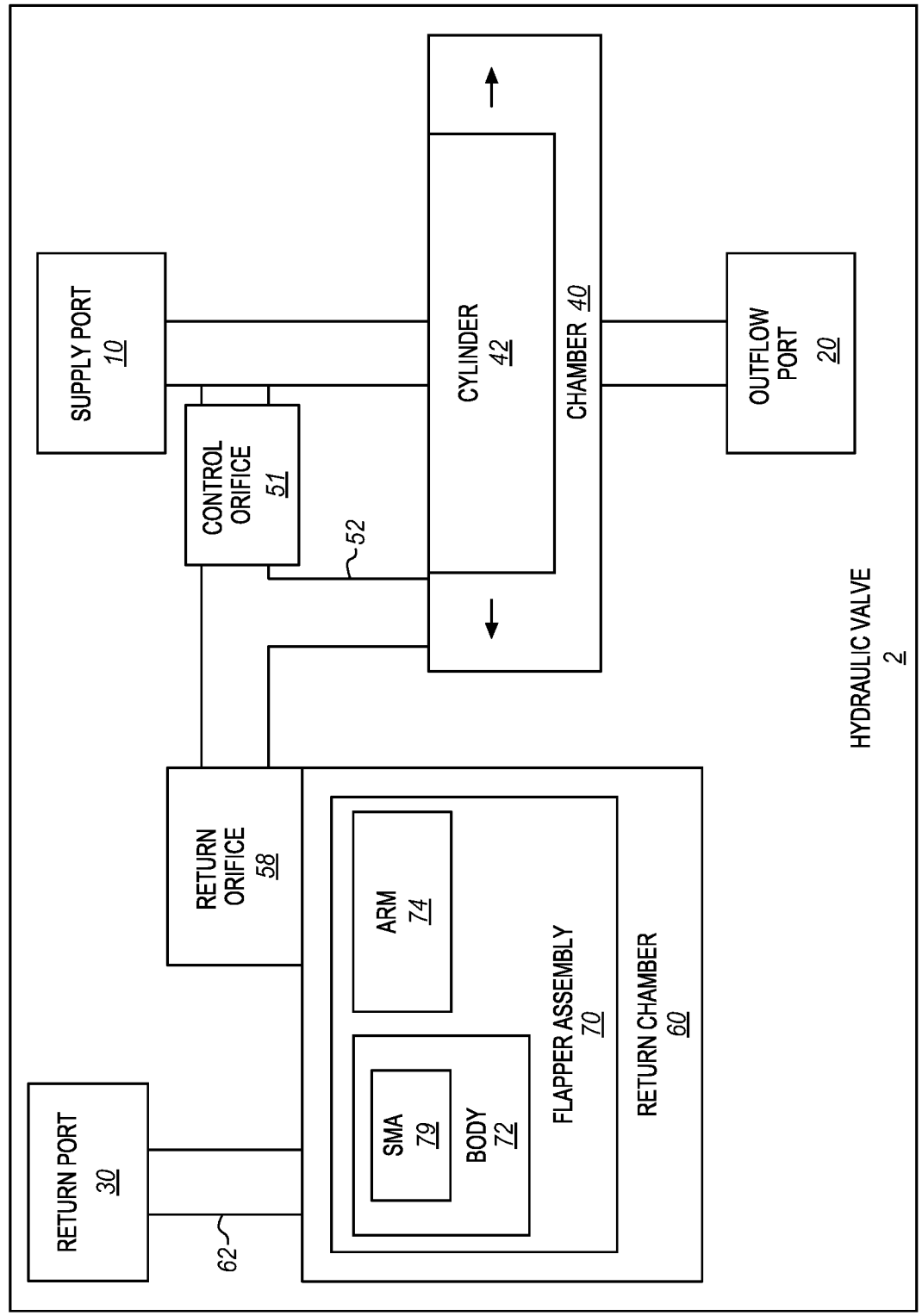
FIG. 1 is a block diagram of a hydraulic valve in an illustrative embodiment.

FIG. 1 is a block diagram of a hydraulic valve 2 in an illustrative embodiment. Hydraulic valve 2 controllably enables or prevents the flow of hydraulic fluid from a supply port 10 to an outflow port 20, based on a position of a cylinder 42. Specifically, hydraulic valve 2 includes a supply port 10 that receives hydraulic fluid, as well as a control orifice 51 that enables the passage of hydraulic fluid into a control line 52. Depending on pressure at the control line 52, a cylinder 42 changes position within a chamber 40 to either enable or prevent the flow of hydraulic fluid via outflow port 20. When hydraulic fluid travels through outflow port 20, the hydraulic valve 2 is open.

Hydraulic valve 2 also includes a return orifice 58, which is controllably blocked by the movement of an arm 74 of a flapper assembly 70. The flapper assembly 70 is disposed within a return chamber 60 that is coupled with a return line 62 that leads to a return port 30. In this embodiment, the flapper assembly 70 includes a body 72, which is made from SMA 79. As the body 72 is heated, the SMA 79 transitions to an austenitic phase. When heating is halted, the SMA 79 transitions to a martensitic phase. These changes in phase change the shape of the SMA 79, causing the arm 74 to change positions and thereby selectively block the return orifice 58. By selectively blocking the return orifice 58, the pressure of the control line 52, and hence the position of the cylinder 42, may be reliably controlled.

Figure 2:
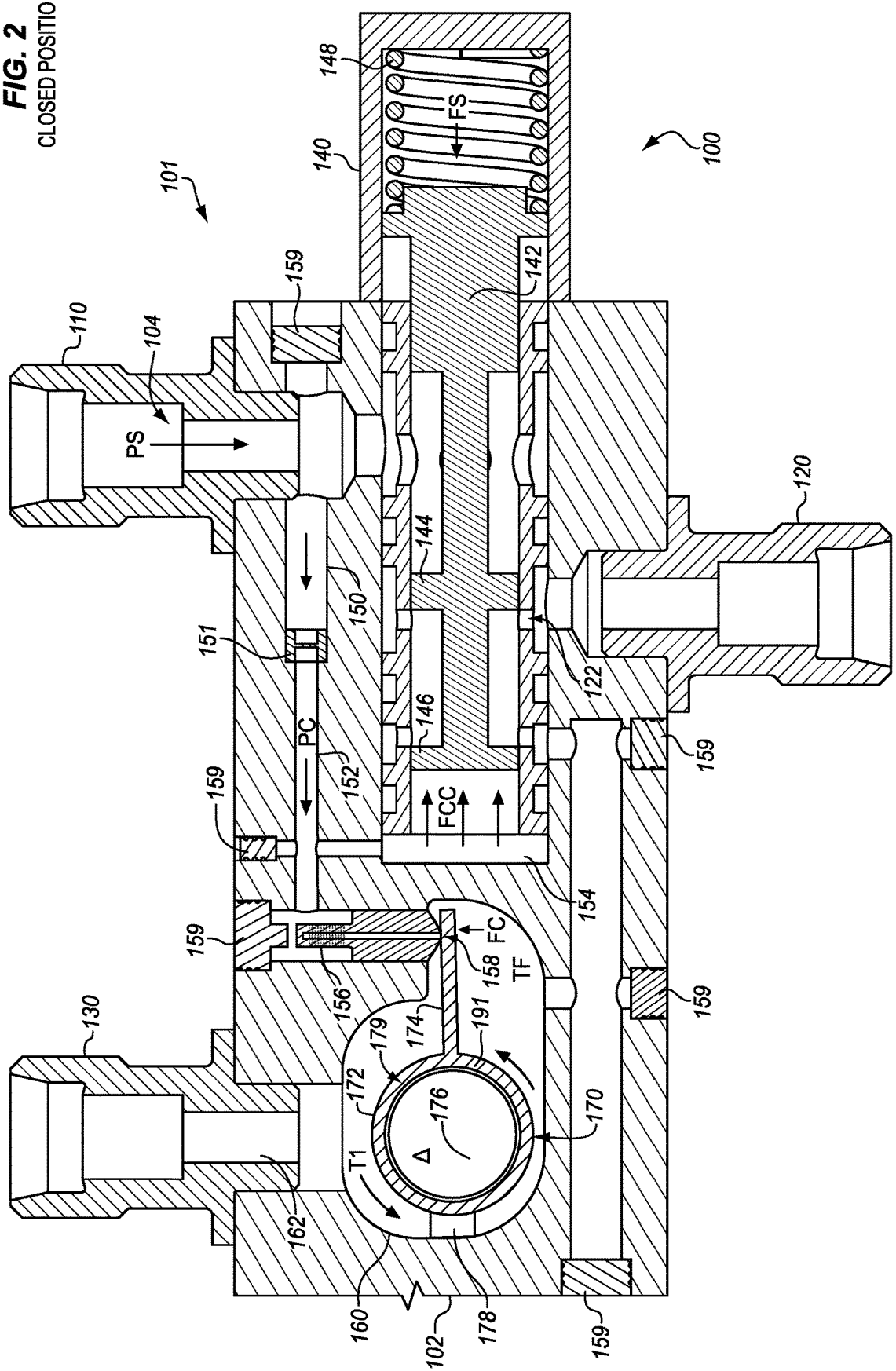
FIG. 2 illustrates a hydraulic valve in a closed position in an illustrative embodiment.

FIG. 2 illustrates a hydraulic valve 100 in a closed position 101 (also referred to as a "bypass position" or "shutoff position") in an illustrative embodiment. Hydraulic valve 100 comprises any system, component, or device operable to controllably permit or prevent the flow of hydraulic fluid 104 from a supply port 110 to an outflow port 120. In the closed position 101, the hydraulic valve 100 blocks flow to the outflow port 120. This means that hydraulic fluid 104 does not reach the outflow port 120, and hence any hydraulic machinery (e.g., an actuator) coupled with the outflow port 120 does not perform work.

In this embodiment, the hydraulic valve 100 controls flow via the operation of a cylinder 142 disposed within a chamber 140. In FIG. 1, the cylinder 142 is held in the closed position 101 due to forces applied by hydraulic fluid 104 at a control line 152. Specifically, hydraulic fluid 104 at a supply pressure (PS) travels from the supply port 110 into chamber 150 and through a control orifice 151 (e.g., a narrow passage) into a control line 152. Hydraulic fluid 104 in the control line 152 is maintained at a control pressure (PC). As the hydraulic fluid 104 accumulates in control line 152, the control pressure increases until it reaches the supply pressure. This results in hydraulic fluid 104 in chamber 154 accumulating and pressing against cylinder 142 with an increasing amount of cylinder closure force (FCC). The cylinder closure force is equal to an area of an end 146 of the cylinder 142 that is exposed to the hydraulic fluid 104 in the chamber 154, multiplied by the control pressure.

As the control pressure increases, the cylinder closure force builds until it exceeds an amount of spring force (FS) applied to the cylinder 142 by the spring 148. This pushes the cylinder 142 to the right (as shown in its current position), blocking the passage of hydraulic fluid 104 to the outflow port 120. Specifically, a ring 144 of the cylinder 142 blocks the flow of hydraulic fluid 104 into an inlet 122 of the outflow port 120.

Hydraulic fluid 104 accumulates in control line 152 because it has no other place to go. This is because flapper assembly 170 has been operated to press an arm 174 against a return orifice 158 coupled with the control line 152. This operation blocks the return orifice 158 with sufficient force to prevent the flow of hydraulic fluid 104. If the return orifice 158 were not blocked, hydraulic fluid 104 would travel through filter 156 towards the return orifice 158. In this embodiment, filter 156 prevents the flow of particles that would clog the return orifice 158, and is accessible for cleaning via the removal of expansion plug 159. Specifically, the filter 156 filters the hydraulic fluid 104 at the control line 152, prior to the hydraulic fluid 104 reaching the return orifice 158.

Flapper assembly 170 is disposed within return chamber 160, which forms part of a return line 162 that leads to return port 130. In this embodiment, the various passages and lines depicted within the hydraulic valve 100 have been machined out of body 102. Body 102 may be made out of any suitable material, such as metal or ceramic. Furthermore, machined-out regions of body 102 may be accessible via one or more expansion plugs 159.

Flapper assembly 170 is operated to selectively enable or prevent the flow of hydraulic fluid 104 through the return orifice 158. Flapper assembly 170 includes a body 172, which is affixed at portion 178 to the return chamber 160 of the hydraulic valve 100. Body 172 is made from a Shape Memory Alloy (SMA) 179, and the SMA 179 may comprise nitinol or another alloy. When the SMA 179 reaches a first phase temperature (T1), such as a temperature higher than a hydraulic fluid temperature (TF), the SMA 179 is stably held at a first phase (e.g., austenite). When SMA 179 reaches a second phase temperature (T2, of FIG. 2) which may also be higher than the hydraulic fluid temperature, the SMA 179 is stably held at a second phase (e.g., martensite).

As the SMA 179 changes temperature between T1 and T2, it undergoes a phase change between austenite and martensite. That is, upon cooling the SMA 179 transitions to a martensitic phase, while upon heating the SMA 179 transitions to an austenitic phase. This phase change results in a change in shape of the body 172. Because the body 172 remains fixed at portion 178 to the return chamber 160, the change in shape twists the body 172. The twisting of the body 172 results in a change in position of the arm 174, pressing the arm 174 into the return orifice 158. That is, the arm 174 changes position (e.g., rotates) in response to the phase change of the SMA 179, and the phase change twists the flapper assembly 170 in at least one embodiment. The temperature at which the shape of the body 172 causes the arm 174 to block the return orifice 158 may be a temperature corresponding with either the martensitic phase or the austenitic phase, as a matter of design choice. In this embodiment, T1 represents a high temperature at which the body 172 of the flapper assembly 170 is in an austenitic phase (i.e., austenite 191) and the arm 174 blocks the return orifice 158.

The arm 174 applies a closure force (FC) that exceeds an amount of force applied by hydraulic fluid attempting to travel through the return orifice 158. The closure force exceeds the supply pressure of the hydraulic fluid 104, multiplied by an area of the return orifice 158.

In this embodiment, the body 172 of flapper assembly 170 is tubular, and a heater 176 (e.g., a cartridge heater) is disposed within the body 172. The heater 176 applies heat (A), and this applied heat maintains the body 172 at T1 and/or T2 as desired. Thus, by adjusting a temperature via the heater 176, the SMA 179 is controllably transitioned between the martensitic phase (i.e., martensite 192) and the austenitic phase (i.e., austenite 191). Stated succinctly, adjusting the temperature of the flapper assembly 170 (e.g., by activating the heater 176) initiates a phase change of the SMA 179 discussed above. Hence, control signals sent to heater 176 may be utilized to controllably place the arm 174 into contact with the return orifice 158 (thereby blocking the flow of hydraulic fluid 104) and then removed from the return orifice 158 (thereby enabling the flow of hydraulic fluid 104).

Figure 3:
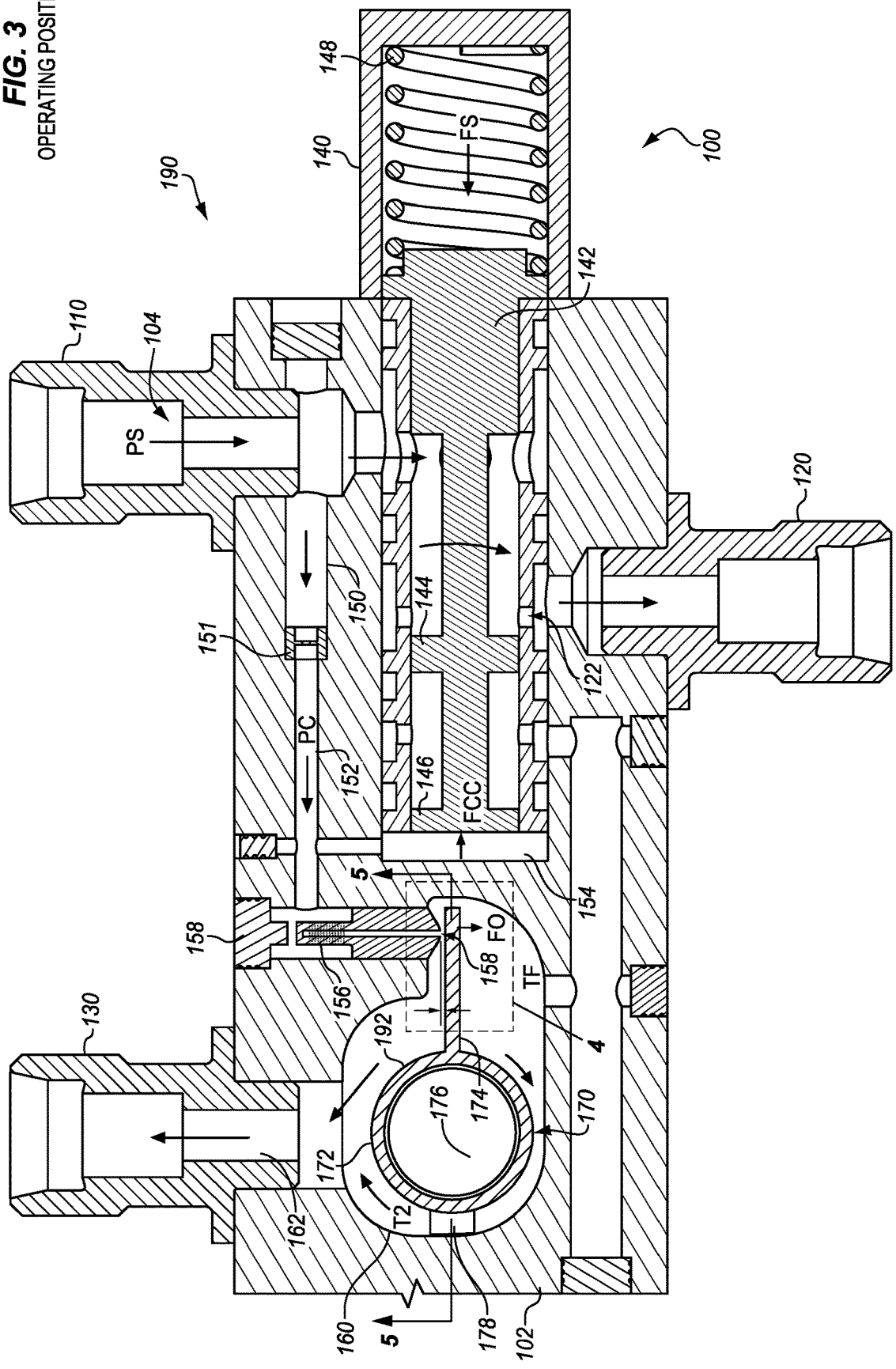
FIG. 3 illustrates a hydraulic valve in an operating position in an illustrative embodiment.

FIG. 3 illustrates the hydraulic valve 100 of FIG. 1 in an operating position 190 (also referred to as an "installed state") in an illustrative embodiment. In FIG. 2, body 172 of the flapper assembly 170 has reached a temperature (T2), at which the SMA 179 is stably maintained in a phase that is distinct from the phase of FIG. 2. In this embodiment, T2 is below a transition temperature of the SMA 179, and hence the SMA 179 is in a martensitic phase (i.e., martensite 192). T2 may be above, equal to, or below a temperature (TF) of the hydraulic fluid, depending on the transition temperature of the SMA 179. In the current phase, the body 172 changes shape, resulting in twisting that retracts the arm 174 from the return orifice 158 with an opening force (FO).

With the arm 174 in a retracted position, hydraulic fluid 104 flows through the return orifice 158 and out through return port 130. This lowers the control pressure (PC) and hence reduces the amount of cylinder closure force (FCC) applied to the cylinder 142. When the amount of cylinder force is reduced below the spring force (FS), the cylinder 142 is moved to the left into the operating position 190 shown in FIG. 2, which permits the passage of hydraulic fluid 104 through the cylinder 142, into inlet 122, and through outflow port 120. The hydraulic fluid 104 then performs work, for example by operating an actuator that is hydraulically coupled with the outflow port 120.

The hydraulic valve 100 illustrated in FIGS. 1-3 provides a substantial technical benefit over prior systems by reliably controlling the flow of hydraulic fluid, without the need for an electronic motor or actuator to adjust the position of a flapper valve. This increases reliability while reducing complexity.

Figure 4:
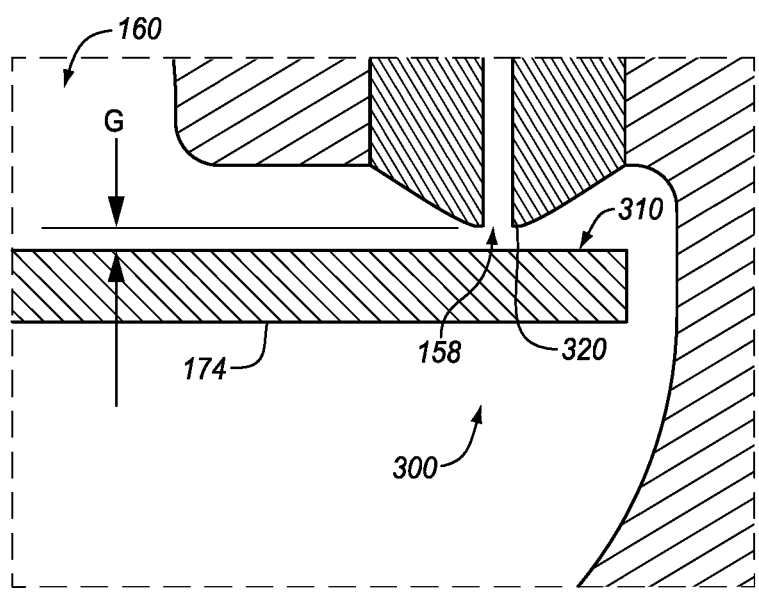
FIG. 4 depicts an interface between an arm of a flapper assembly and a return orifice in an illustrative embodiment.

Further details of the interface between the return orifice 158 and the arm 174 are provided with regard to FIG. 4. FIG. 4 depicts an interface 300 between an arm 174 of a flapper assembly 170 and a return orifice 158 in an illustrative embodiment, and corresponds with section 4 of FIG. 3. In this embodiment, return orifice 158 is circular in cross-section and has a diameter (D). The arm 174, in a retracted position, leaves a gap (G) between a surface 310 of the arm 174 and a perimeter 320 of the return orifice 158. A measurement of the gap, multiplied by the circumference OD) of the return orifice 158, defines an area through which flow out of the return orifice 158 is permitted by the arm 174.

Figure 5:
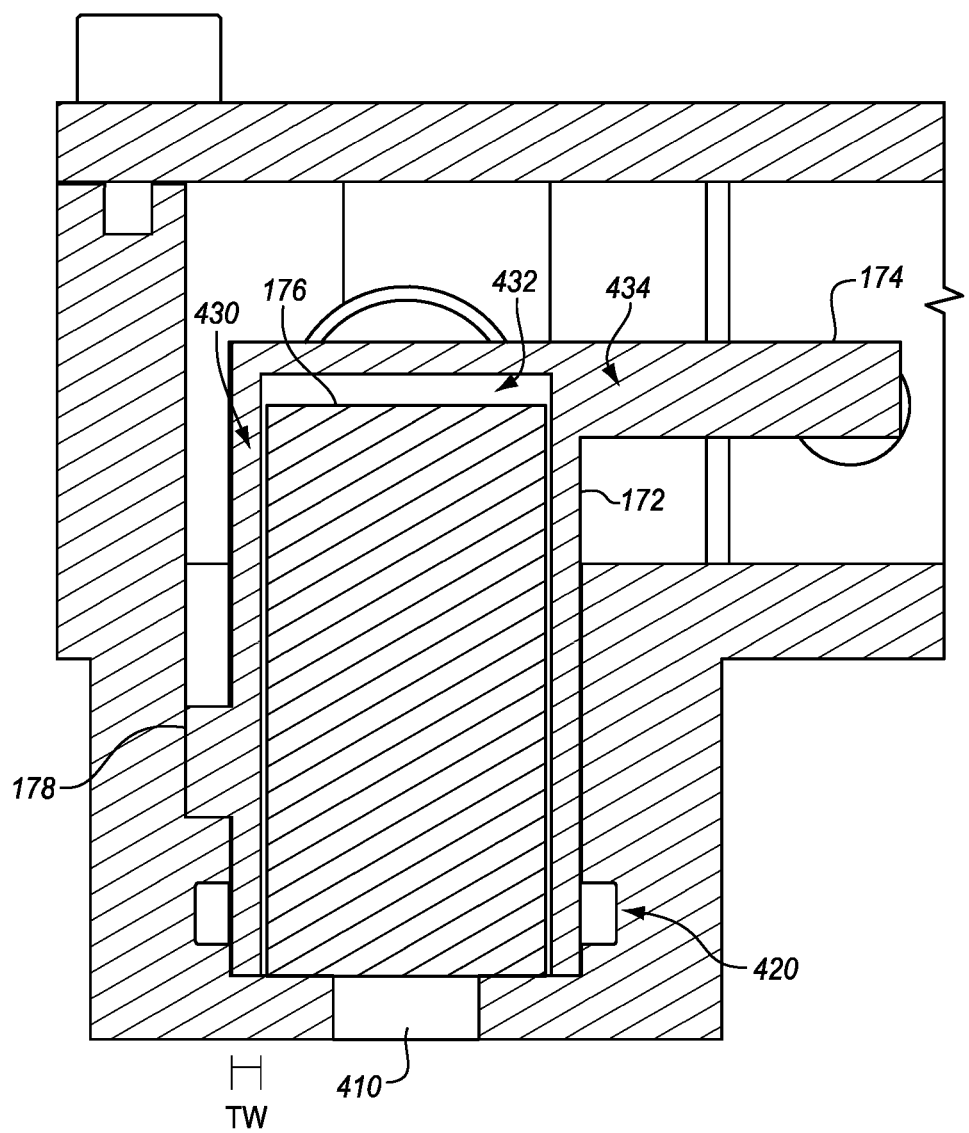
FIG. 5 is a section cut view of a flapper assembly in an illustrative embodiment.

FIG. 5 is a section cut view of a flapper assembly 170 in an illustrative embodiment, and corresponds with view arrows 5 of FIG. 3. FIG. 5 shows that the body 172 of the flapper assembly 170 is hollow, and that a heater 176 (e.g., a cartridge heater) is disposed within the volume 432 defined by walls 430 of the body 172 which are made from nitinol 434. That is, heater 176 is internal to the body 172. In one embodiment, the heater 176 comprises a resistive heater that is powered by electric current. The walls 430 have a narrow wall thickness (TW), such as a wall thickness that is less than a fifth of a diameter of the body 172. This narrow wall thickness facilitates rapid heating of the body 172 via the heater 176. The heater 176 itself is accessible via passage 410, which may include wiring or other components for powering the heater 176. Passage 410 is sealed via rod seal gland 420.

Figure 6:
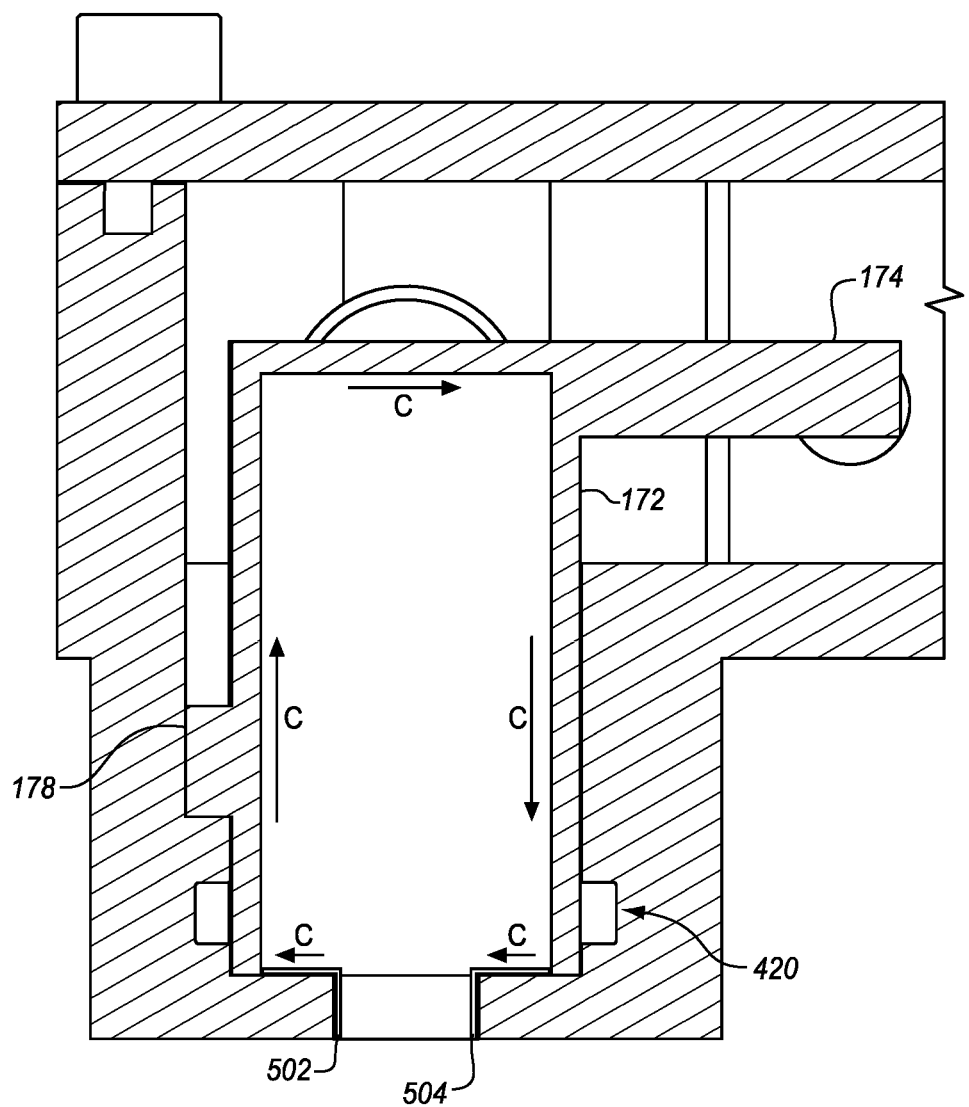
FIG. 6 is a section cut view of a further flapper assembly in an illustrative embodiment.

FIG. 6 is a section cut view of a further flapper assembly 170 in an illustrative embodiment, and also corresponds with view arrows 5 of FIG. 3. In this embodiment, the body 172 of the flapper assembly 170 is itself a heater that is heated via the passage of electric current (C) received from wires 502 and 504 that drive current through the body 172 of the flapper assembly 170. Thus, in this embodiment adjusting the temperature of the body 172 and/or SMA 179 comprises driving current through the flapper assembly 170. Implementing the flapper assembly 170 itself as a heater provides a technical benefit by reducing the number of components needed by the hydraulic valve 100.

Figure 7:
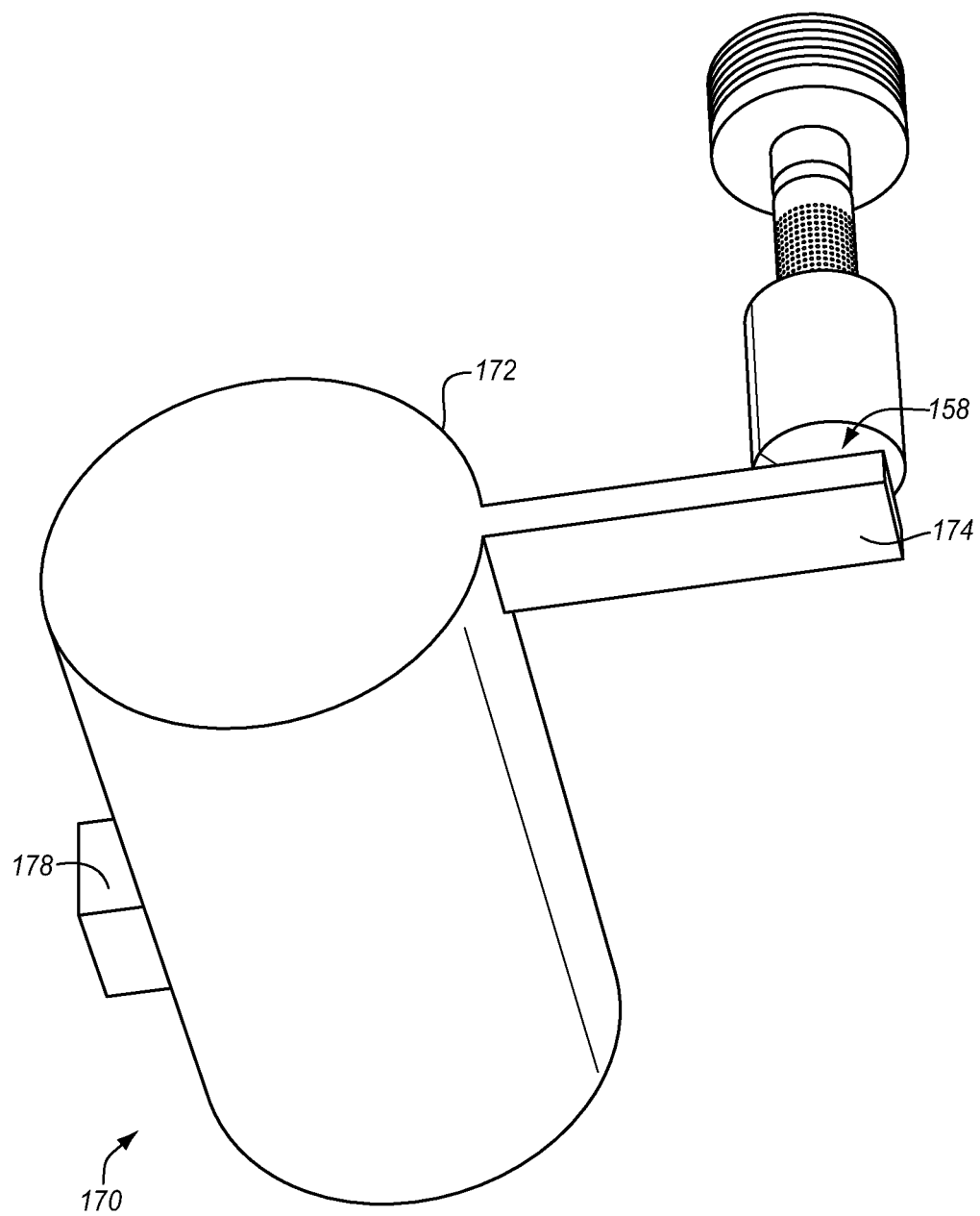
FIG. 7 is a perspective view of a flapper assembly and return orifice in an illustrative embodiment.

FIG. 7 is a perspective view of a flapper assembly 170 and return orifice 158 in an illustrative embodiment. In this embodiment, the flapper assembly 170 includes an arm 174 that blocks the return orifice 158, which is hidden from view.

FIG. 7 provides an illustration of the differences in dimensions between body 172 and arm 174.

Illustrative details of the operation of hydraulic valve 100 will be discussed with regard to FIG. 8. Assume, for this embodiment, that hydraulic valve 100 has been installed in a hydraulic system for the purpose of controlling the flow of hydraulic fluid 104. Furthermore, assume that the hydraulic valve 100 is actively permitting the flow of hydraulic fluid 104 to the outflow port 120 in order to perform work, such, as lifting a wing flap of an aircraft via an actuator.

Figure 8:
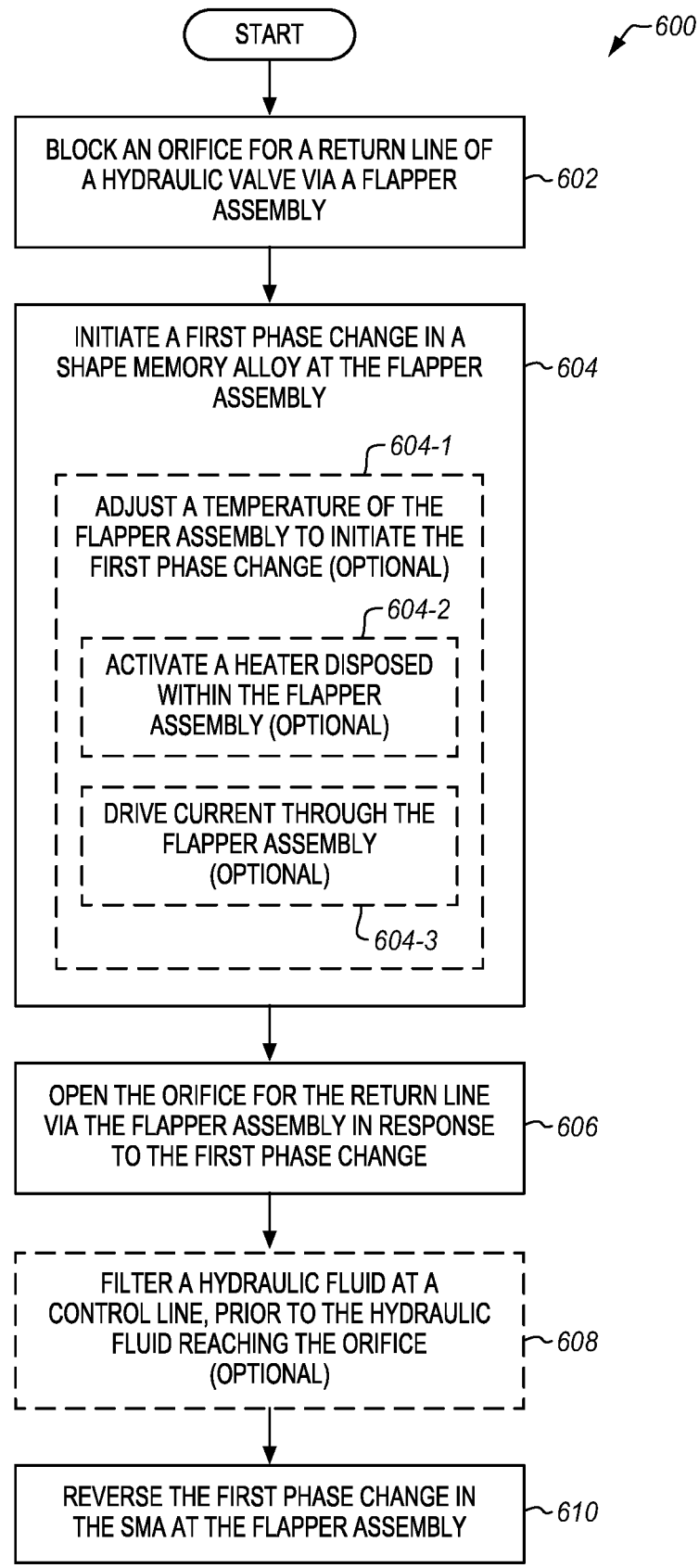
FIG. 8 is a flowchart illustrating a method for operating a flapper assembly of a hydraulic valve in an illustrative embodiment.

FIG. 8 is a flowchart illustrating a method 600 for operating a flapper assembly 170 of a hydraulic valve 100 in an illustrative embodiment. The steps of method 600 are described with reference to hydraulic valve 100 of FIGS. 2-3, but those skilled in the art will appreciate that method 600 may be performed in other hydraulic control devices and is not limited to three-way, two position valves. The steps of the flowcharts described herein are not all inclusive and may include other steps not shown. The steps described herein may also be performed in an alternative order.

At a point in time, such as after a takeoff period of a flight, an operator of the hydraulic valve 100 desires that the actuator linked to the hydraulic valve 100 stop performing work. To this end, the operator provides a signal to a controller (e.g., controller 790 of FIG. 9) to close the hydraulic valve 100. In one embodiment, this causes the controller 790 to apply heat to the flapper assembly 170 via heater 176, resulting in a change in temperature that causes a phase transition for SMA 179 at the flapper assembly 170. In this embodiment, the SMA 179 transitions to an austenitic phase (i.e., austenite 191). In a further embodiment, this causes the controller 790 to halt the application of heat via heater 176, resulting in cooling that causes the SMA 179 to transition to a martensitic phase (i.e., martensite 192). In either case, the change in phase causes the arm 174 of the flapper assembly 170 to move to a closed position shown in FIG. 1.

The operations discussed above bring about step 602, wherein the return orifice 158 for the return line 162 of the hydraulic valve 100 is blocked via flapper assembly 170. That is, the arm 174 of the flapper assembly 170 is driven into position against the return orifice 158, blocking the flow of hydraulic fluid through the return orifice 158.

Later on, such as during a landing period of the flight, the operator of the hydraulic valve 100 desires that the actuator linked to the hydraulic valve 100 resumes the performance of work. Thus, the operator transmits a signal via the controller 790 to activate the actuator. In one embodiment, this causes the controller 790 to apply heat to the flapper assembly 170 via heater 176, resulting in heating. The heating leads to step 604, which comprises initiating a phase change in SMA 179 at the flapper assembly 170. In this embodiment, the phase change causes the SMA 179 to transition to an austenitic phase (i.e., austenite 191). In a further embodiment, the signal from the operator causes the controller 790 to halt the application of heat via heater 176, resulting in cooling that causes the SMA 179 to transition to a martensitic phase (i.e., martensite 192).

In one embodiment, step 604 includes step 604-1 of adjusting a temperature of the flapper assembly to initiate the phase change. This may comprise step 604-2 of activating a heater 176 disposed within the flapper assembly 170, or step 604-3 of driving current through the flapper assembly 170.

In either case, the change in phase from step 604 causes the arm 174 of the flapper assembly 170 to move to a retracted position shown in FIG. 3. Thus, in step 606, the return orifice 158 for the return line 162 opens via the flapper assembly 170, in response to forces generated by the phase change. Thus, hydraulic fluid 104 may flow through the return orifice 158. Method 600 may further include step 608 of filtering the hydraulic fluid 104 at a control line 152 prior to the hydraulic fluid reaching the return orifice 158. The method may further comprise step 610 of reversing the phase change in the SMA 179 at the flapper assembly 170.

Method 600 provides a substantial technical benefit over prior techniques for operating hydraulic valves, because it enables SMA materials to control the flow of hydraulic fluid. Because SMA materials reliably change phase (and hence shape) in response to changes in temperature, the activation of a hydraulic valve may be reliably controlled by adjusting a temperature of a flapper assembly for that valve. This eliminates the need for expensive electrically driven motors or actuators for such flapper assemblies.

Examples

In the following examples, additional processes, systems, and methods are described in the context of a hydraulic valve that controls flow.

Figure 9:
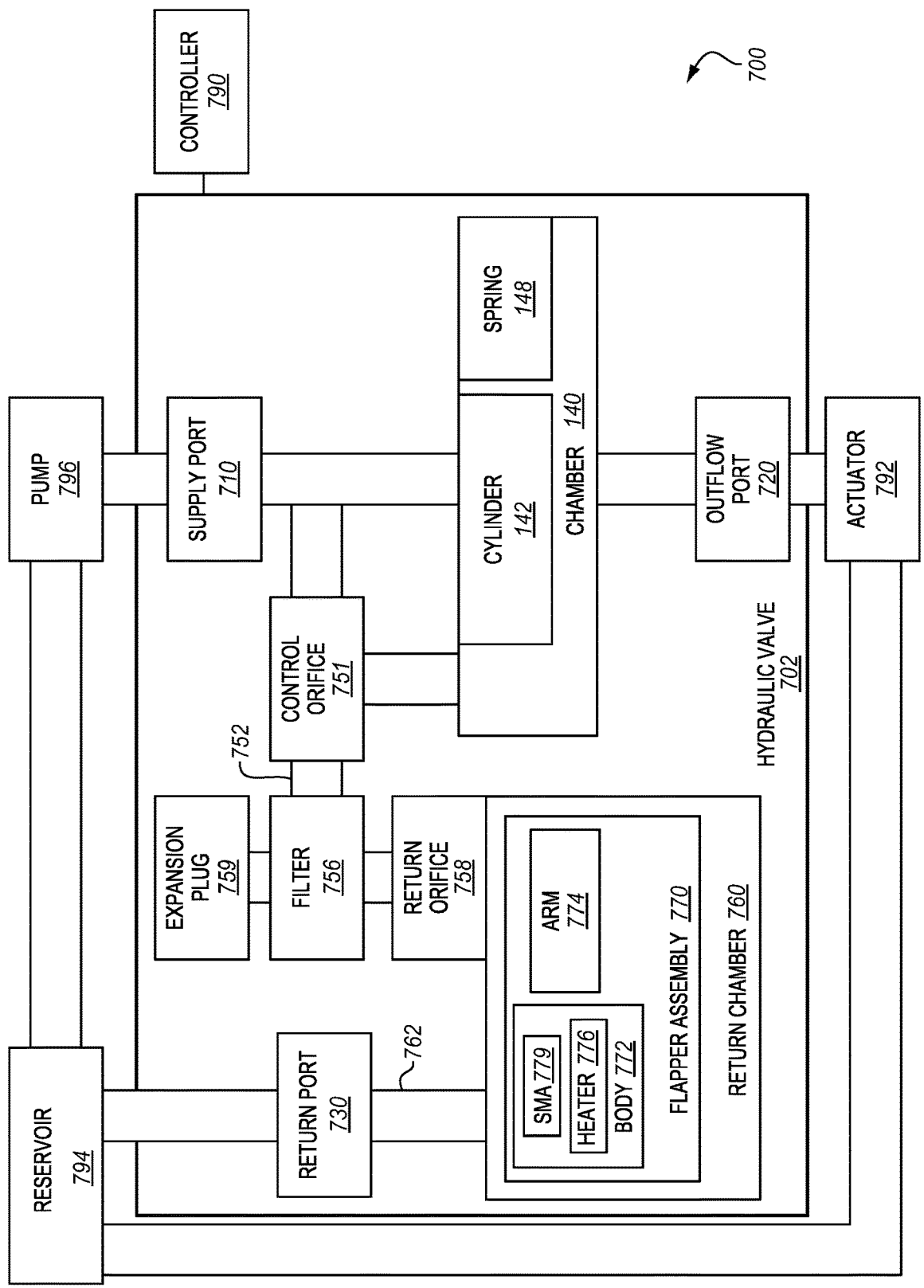
FIG. 9 is a block diagram of a hydraulic system in an illustrative embodiment.

FIG. 9 is a block diagram of a hydraulic system 700 in an illustrative embodiment. Hydraulic system 700 includes an actuator 792 that is controllably provided with hydraulic fluid via a hydraulic valve 702. The hydraulic valve 702 is controlled by a controller 790, and receives pressurized hydraulic fluid from a pump 796 that draws the hydraulic fluid from a reservoir 794. In one embodiment, controller 790 is implemented as custom circuitry, as a hardware processor executing programmed instructions stored in memory, or some combination thereof.

In this embodiment, the hydraulic valve 702 includes a supply port 710 that receives the hydraulic fluid, as well as a control orifice 751 that enables the passage of hydraulic fluid for a control line 752. Depending on pressure at the control line 752, a cylinder 142, which is biased by a spring 148, changes position to enable or prevent the flow of hydraulic fluid via outflow port 720 to actuator 792. It will be well understood that cylinder 142 includes channels and/or passages (not shown) that facilitate the enabling and preventing of hydraulic fluid 104 in the manner described when the cylinder is in a closed position versus an operating position.

Hydraulic valve 702 also includes a filter 756 at the control line 752, which is accessible for maintenance via an expansion plug 759. Hydraulic fluid passing through the filter 756 reaches return orifice 758, which is controllably blocked by the movement of an arm 774 of a flapper assembly 770. The flapper assembly 770 is disposed within a return chamber 760 that is coupled with a return line 762 that leads to a return port 730. In this embodiment, the flapper assembly 770 includes a body 772, which is made from SMA 779. As the body 772 is heated by the action of a heater 776, the SMA 779 transitions to an austenitic phase. When the heater 776 is deactivated, the SMA 779 transitions to a martensitic phase. The heater 776 is controlled via signaling from controller 790.

Figure 10:
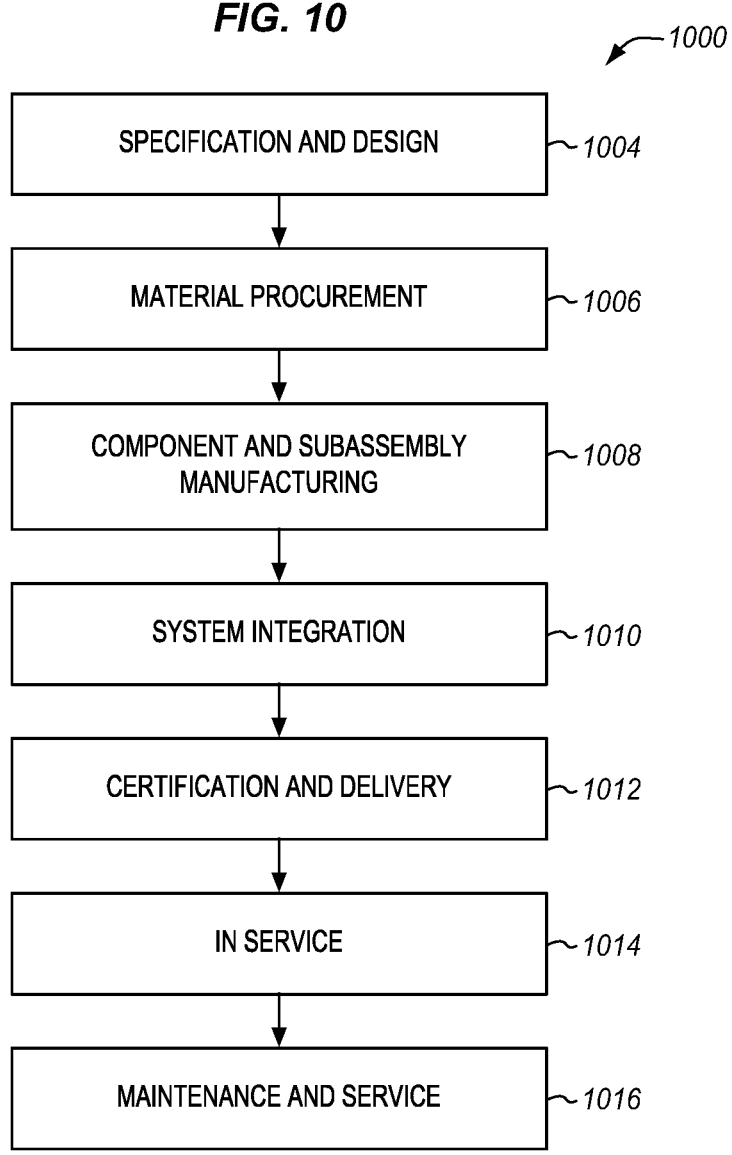
FIG. 10 is a flow diagram of aircraft production and service methodology in an illustrative embodiment.
Figure 11:
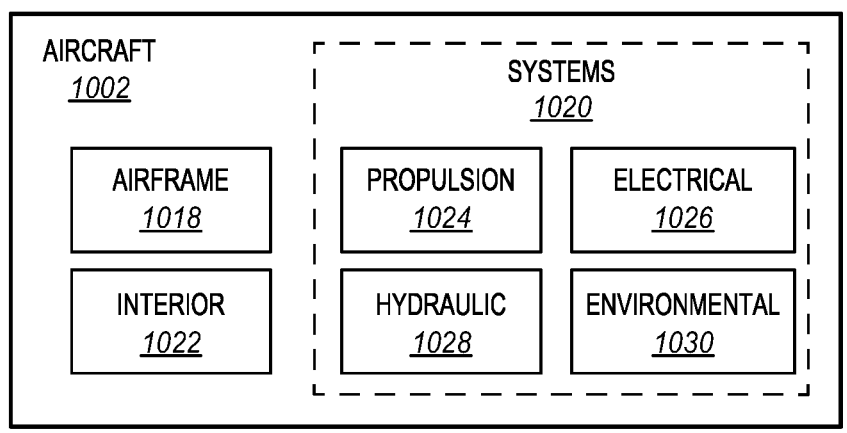
FIG. 11 is a block diagram of an aircraft in an illustrative embodiment.

Referring more particularly to the drawings, embodiments of the disclosure may be described in the context of aircraft manufacturing and service in method 1000 as shown in FIG. 10 and an aircraft 1002 as shown in FIG. 11. During pre-production, method 1000 may include specification and design 1004 of the aircraft 1002 and material procurement 1006. During production, component and subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine work in maintenance and service 1016 (which may also include modification, reconfiguration, refurbishment, and so on). Apparatus and methods embodied herein may be employed during any one or more suitable stages of the production and service described in method 1000 (e.g., specification and design 1004, material procurement 1006, component and subassembly manufacturing 1008, system integration 1010, certification and delivery 1012, service 1014, maintenance and service 1016) and/or any suitable component of aircraft 1002 (e.g., airframe 1018, systems 1020, interior 1022, propulsion system 1024, electrical system 1026, hydraulic system 1028, environmental 1030).

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 1002 produced by method 1000 may include an airframe 1018 with a plurality of systems 1020 and an interior 1022. Examples of systems 1020 include one or more of a propulsion system 1024, an electrical system 1026, a hydraulic system 1028, and an environmental system 1030. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1000. For example, components or subassemblies corresponding to component and subassembly manufacturing 1008 may be fabricated or manufactured in a manner similar to components or subassemblies produced while the aircraft 1002 is in service. Also, one or more apparatus embodiments, method embodiments, or a combination thereof may be utilized during the subassembly manufacturing 1008 and system integration 1010, for example, by substantially expediting assembly of or reducing the cost of an aircraft 1002. Similarly, one or more of apparatus embodiments, method embodiments, or a combination thereof may be utilized while the aircraft 1002 is in service, for example and without limitation during the maintenance and service 1016. Thus, the invention may be used in any stages discussed herein, or any combination thereof, such as specification and design 1004, material procurement 1006, component and subassembly manufacturing 1008, system integration 1010, certification and delivery 1012, service 1014, maintenance and service 1016 and/or any suitable component of aircraft 1002 (e.g., airframe 1018, systems 1020, interior 1022, propulsion system 1024, electrical system 1026, hydraulic system 1028, and/or environmental 1030).

In one embodiment, a part comprises a portion of hydraulic system 1028, and is manufactured during component and subassembly manufacturing 1008. The part may then be assembled into an aircraft in system integration 1010, and then be utilized in service 1014 until wear renders the part unusable. Then, in maintenance and service 1016, the part may be discarded and replaced with a newly manufactured part. Inventive components and methods may be utilized throughout component and subassembly manufacturing 1008 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for controlling a hydraulic valve, the method comprising:
   closing the hydraulic valve, the hydraulic valve comprising:
   a supply port, an outflow port, and a return port;
   a cylinder biased by a spring, and configured to control a flow of hydraulic fluid from the supply port to the outflow port based on a position of the cylinder;
   a control line and a control chamber fluidly coupled to the supply port, wherein the hydraulic fluid that accumulates in the control chamber presses against an end of the cylinder opposite the spring;
   a return chamber and a return orifice fluidly coupled between the control line and the return port; and
   a flapper assembly disposed within the return chamber, the flapper assembly comprising:
   a body that is hollow, and comprising a Shape Memory Alloy (SMA);
   a heater disposed within a volume of the body, and configured to adjust a temperature of the flapper assembly to initiate a phase change in the SMA; and
   an arm coupled with the body, and configured to change position in response to the SMA undergoing the phase change;
   wherein the closing comprises blocking the return orifice via the flapper assembly;
   initiating a phase change in SMA; and
   opening the return orifice by retracting the arm from the return orifice in response to the phase change to open the hydraulic valve.

2. The method of claim 1 wherein:
   when a surface of the arm presses against the return orifice and blocks the return orifice, a pressure of the hydraulic fluid accumulating in the control chamber increases to overcome a spring force from the spring and move the cylinder to a closed position where the hydraulic fluid is blocked to the outflow port.

3. The method of claim 2 wherein:
   when the arm retracts from the return orifice and the hydraulic fluid flows through the return orifice and out of the return port, the pressure of the hydraulic fluid accumulating in the control chamber is reduced below the spring force to move the cylinder to an operating position where passage of the hydraulic fluid is permitted to the outflow port.

4. The method of claim 1 wherein:
   opening the return orifice permits the flow of the hydraulic fluid to the outflow port to lift a wing flap of an aircraft.

5. The method of claim 1 further comprising:
   adjusting the temperature of the flapper assembly to initiate the phase change.

6. The method of claim 5 wherein:
   adjusting the temperature comprises activating the heater disposed within the flapper assembly.

7. The method of claim 1 wherein:
   a portion of the body is fixed to the return chamber; and
   the phase change twists the body to change the position of the arm.

8. The method of claim 1 further comprising:
   filtering the hydraulic fluid at the control line prior to the hydraulic fluid reaching the return orifice.

9. The method of claim 1 wherein:
   the phase change twists the flapper assembly.

10. The method of claim 1 further comprising:
    reversing the phase change in the SMA at the flapper assembly; and
    blocking the return orifice for the return line of the hydraulic valve via the flapper assembly.

11. A hydraulic valve, comprising:
    a supply port, an outflow port, and a return port;
    a cylinder biased by a spring, and configured to control a flow of hydraulic fluid from the supply port to the outflow port based on a position of the cylinder;
    a control line and a control chamber fluidly coupled to the supply port, wherein the hydraulic fluid that accumulates in the control chamber presses against an end of the cylinder opposite the spring;
    a return chamber and a return orifice fluidly coupled between the control line and the return port; and
    a flapper assembly disposed within the return chamber, the flapper assembly comprising:
    a body that is hollow, and comprising a Shape Memory Alloy (SMA);
    a heater disposed within a volume of the body, and configured to adjust a temperature of the flapper assembly to initiate a phase change in the SMA; and
    an arm coupled with the body, and configured to change position in response to the SMA undergoing the phase change, wherein the arm controllably blocks the return orifice in response to changes in phase of the SMA.

12. The hydraulic valve of claim 11 wherein:
when a surface of the arm presses against the return orifice and blocks the return orifice, a pressure of the hydraulic fluid accumulating in the control chamber increases to overcome a spring force from the spring and move the cylinder to a closed position where the hydraulic fluid is blocked to the outflow port.

13. The hydraulic valve of claim 12 wherein:
when the arm retracts from the return orifice and the hydraulic fluid flows through the return orifice and out of the return port, the pressure of the hydraulic fluid accumulating in the control chamber is reduced below the spring force to move the cylinder to an operating position where passage of the hydraulic fluid is permitted to the outflow port.

14. The hydraulic valve of claim 11 wherein:
the heater comprises a resistive heater powered by electric current.

15. The hydraulic valve of claim 11 wherein:
walls of the body have a wall thickness less than a fifth of a diameter of the body.

16. The hydraulic valve of claim 11 wherein:
the body is tubular.

17. The hydraulic valve of claim 11 wherein:
a portion of the body is fixed to the return chamber; and
the phase change twists the body to change the position of the arm.

18. The hydraulic valve of claim 11 further comprising:
a filter disposed upstream of the return orifice.

19. A hydraulic valve, comprising:
a supply port, an outflow port, and a return port;
a cylinder biased by a spring, and configured to control a flow of hydraulic fluid from the supply port to the outflow port based on a position of the cylinder;
a control line and a control chamber fluidly coupled to the supply port, wherein the hydraulic fluid that accumulates in the control chamber presses against an end of the cylinder opposite the spring;
a return chamber and a return orifice fluidly coupled between the control line and the return port; and
a flapper assembly disposed within the return chamber, the flapper assembly comprising:
  a body comprising a Shape Memory Alloy (SMA), and a heater internal to the body configured to adjust a temperature of the flapper assembly to initiate a phase change in the SMA, wherein a portion of the body is fixed to the return chamber; and
  an arm coupled with the body, and configured to change position in response to the SMA undergoing the phase change that twists the body to change the position of the arm, wherein the arm controllably blocks the return orifice in response to changes in phase of the SMA.

20. The hydraulic valve of claim 19 wherein:
the body is tubular.

* * * * *